United States Patent
Michel et al.

(10) Patent No.: US 12,378,010 B2
(45) Date of Patent: *Aug. 5, 2025

(54) VEHICLE CAPTURE ASSEMBLIES AND RELATED DEVICES, SYSTEMS, AND METHODS

(71) Applicant: Northrop Grumman Systems Corporation, Falls Church, VA (US)

(72) Inventors: Matthew Alan Michel, Oak Hill, VA (US); Michael Alfred Tosto, Springfield, VA (US); Kevin David Tebbe, Alexandria, VA (US); Daisaku Inoyama, Great Falls, VA (US); John Francis Papayanopoulos, West Orange, NJ (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,985

(22) Filed: Nov. 25, 2023

(65) Prior Publication Data

US 2024/0083602 A1    Mar. 14, 2024

Related U.S. Application Data

(63) Continuation of application No. 17/207,644, filed on Mar. 20, 2021, now Pat. No. 11,827,386.

(60) Provisional application No. 63/019,891, filed on May 4, 2020.

(51) Int. Cl.
  *B64G 1/64*    (2006.01)

(52) U.S. Cl.
  CPC ................................ *B64G 1/6462* (2023.08)

(58) Field of Classification Search
  CPC ......... B64G 1/64; B64G 1/646; B64G 1/1078
  See application file for complete search history.

(56) References Cited

U.S. PATENT DOCUMENTS

| 3,268,091 | A | 8/1966 | Melton |
| 3,508,723 | A | 4/1970 | Warren |
| 3,526,372 | A | 9/1970 | Fentress |
| 3,662,973 | A | 5/1972 | Collins |
| 4,177,964 | A | 12/1979 | Hujsak |
| 4,219,171 | A | 8/1980 | Rudmann |

(Continued)

FOREIGN PATENT DOCUMENTS

| CN | 104071357 | 10/2014 |
| CN | 104908980 | 9/2015 |

(Continued)

OTHER PUBLICATIONS

DLR, iBOSS-intelligent Building Blocks for On-Orbit Satellite Servicing and Assembly; German Aerospace Center (DLR)Space Administration, 2017, 2 pages.

(Continued)

*Primary Examiner* — Arfan Y. Sinaki
(74) *Attorney, Agent, or Firm* — BKRIP LLC

(57) ABSTRACT

Vehicle capture assemblies and related devices, systems, and methods include one or more probe assemblies for engaging with and securing the target vehicle. The one or more probe assemblies may include one or more attenuation features or movable joints to enable and/or dampen movement of the one or more probe assemblies relative to a capture vehicle.

20 Claims, 6 Drawing Sheets

(56) References Cited

U.S. PATENT DOCUMENTS

| | | |
|---|---|---|
| 4,298,178 A | 11/1981 | Hujsak |
| 4,381,092 A | 4/1983 | Barker |
| 4,391,423 A | 7/1983 | Pruett |
| 4,431,333 A | 2/1984 | Chandler |
| 4,449,684 A | 5/1984 | Hinds |
| 4,588,150 A | 5/1986 | Bock |
| 4,657,211 A | 4/1987 | Fuldner |
| 4,664,344 A | 5/1987 | Harwell |
| 4,750,692 A | 6/1988 | Howard |
| 4,880,187 A | 11/1989 | Rourke |
| 4,898,348 A | 2/1990 | Kahn |
| 4,955,559 A | 9/1990 | Kaminskas |
| 5,005,786 A | 4/1991 | Okamoto |
| 5,040,749 A | 8/1991 | Johnson |
| 5,094,410 A | 3/1992 | Johnson |
| 5,104,070 A | 4/1992 | Johnson |
| 5,125,601 A | 6/1992 | Monford, Jr. |
| 5,169,094 A | 12/1992 | Maute |
| 5,253,944 A | 10/1993 | Preston |
| 5,299,764 A | 4/1994 | Scott |
| 5,349,532 A | 9/1994 | Tilley |
| 5,364,046 A | 11/1994 | Dobbs |
| 5,372,340 A | 12/1994 | Ihara |
| 5,429,328 A | 7/1995 | Dobbs |
| 5,449,211 A | 9/1995 | Monford, Jr. |
| 5,490,075 A | 2/1996 | Howard |
| 5,511,748 A | 4/1996 | Scott |
| 5,735,488 A | 4/1998 | Schneider |
| 5,803,407 A | 9/1998 | Scott |
| 5,806,802 A | 9/1998 | Scott |
| 5,813,632 A | 9/1998 | Taylor |
| 6,017,000 A | 1/2000 | Scott |
| 6,032,904 A | 3/2000 | Hosick |
| 6,045,094 A | 4/2000 | Rivera |
| 6,082,678 A | 7/2000 | Maute |
| 6,264,145 B1 | 7/2001 | Maute |
| 6,272,751 B1 | 8/2001 | McMeekin |
| 6,275,751 B1 | 8/2001 | Stallard |
| 6,296,207 B1 | 10/2001 | Tilley |
| 6,299,107 B1 | 10/2001 | Kong |
| 6,322,023 B1 | 11/2001 | Soranno |
| 6,330,987 B1 | 12/2001 | Scott |
| 6,354,540 B1 | 3/2002 | Lewis |
| 6,378,810 B1 | 4/2002 | Pham |
| 6,484,973 B1 | 11/2002 | Scott |
| 6,523,784 B2 | 2/2003 | Steinsiek |
| 6,565,043 B1 | 5/2003 | Wittmann |
| 6,669,148 B2 | 12/2003 | Anderman |
| 6,742,745 B2 | 6/2004 | Tchoryk |
| 6,840,481 B1 | 1/2005 | Gurevich |
| 6,843,446 B2 | 1/2005 | Scott |
| 6,845,303 B1 | 1/2005 | Byler |
| 6,866,232 B1 | 3/2005 | Finney |
| 6,945,500 B2 | 9/2005 | Wingo |
| 6,969,030 B1 | 11/2005 | Jones |
| 7,070,151 B2 | 7/2006 | Robert |
| 7,104,505 B2 | 9/2006 | Tchoryk |
| 7,118,075 B2 | 10/2006 | Schubert |
| 7,163,179 B1 | 1/2007 | Taylor |
| 7,207,525 B2 | 4/2007 | Bischof |
| 7,216,833 B2 | 5/2007 | D'Ausilio |
| 7,216,834 B2 | 5/2007 | D'Ausilio |
| 7,240,879 B1 | 7/2007 | Cepollina |
| 7,293,743 B2 | 11/2007 | Cepollina |
| 7,370,834 B2 | 5/2008 | Scott |
| 7,438,264 B2 | 10/2008 | Cepollina |
| 7,461,818 B2 | 12/2008 | D'Ausilio |
| 7,484,690 B2 | 2/2009 | D'Ausilio |
| 7,513,459 B2 | 4/2009 | Cepollina |
| 7,513,460 B2 | 4/2009 | Cepollina |
| 7,575,199 B2 | 8/2009 | D'Ausilio |
| 7,575,200 B2 | 8/2009 | Behrens |
| 7,588,213 B2 | 9/2009 | D'Ausilio |
| 7,611,096 B2 | 11/2009 | D'Ausilio |
| 7,611,097 B2 | 11/2009 | D'Ausilio |
| 7,624,950 B2 | 12/2009 | D'Ausilio |
| 7,815,149 B1 | 10/2010 | Howard |
| 7,823,837 B2 | 11/2010 | Behrens |
| 7,828,249 B2 | 11/2010 | Ritter |
| 7,857,261 B2 | 12/2010 | Tchoryk, Jr. |
| 7,861,974 B2 | 1/2011 | Hays |
| 7,861,975 B2 | 1/2011 | Behrens |
| 7,992,824 B2 | 8/2011 | Tchoryk, Jr. |
| 8,006,937 B1 | 8/2011 | Romano |
| 8,006,938 B2 | 8/2011 | Behrens |
| 8,016,242 B2 | 9/2011 | Baumann |
| 8,052,092 B2 | 11/2011 | Atmur |
| 8,056,864 B2 | 11/2011 | Hays |
| 8,074,935 B2 | 12/2011 | Gryniewski |
| 8,181,911 B1 | 5/2012 | Gryniewski |
| 8,196,870 B2 | 6/2012 | Gryniewski |
| 8,205,838 B2 | 6/2012 | Moorer, Jr. |
| 8,226,046 B2 | 7/2012 | Poulos |
| 8,240,613 B2 | 8/2012 | Ritter |
| 8,245,370 B2 | 8/2012 | Ritter |
| 8,333,347 B2 | 12/2012 | Ritter |
| 8,412,391 B2 | 4/2013 | Paluszek |
| 8,448,904 B2 | 5/2013 | Gryniewski |
| 8,628,044 B2 | 1/2014 | Poulos |
| 8,899,527 B2 | 12/2014 | Allen |
| 9,108,747 B2 | 8/2015 | Roberts |
| 9,284,073 B2 | 3/2016 | Bigelow |
| 9,302,793 B2 | 4/2016 | Ghofranian |
| 9,321,175 B2 | 4/2016 | Smith |
| 9,399,295 B2 | 7/2016 | Roberts |
| 9,434,485 B1 | 9/2016 | Lehocki |
| 9,463,883 B2 | 10/2016 | Bigelow |
| 9,527,607 B2 | 12/2016 | Celerier |
| 9,573,703 B2 | 2/2017 | Celerier |
| 9,809,327 B2 | 11/2017 | Rossettini |
| 9,878,806 B2 | 1/2018 | Helmer |
| 9,914,550 B1 | 3/2018 | Price |
| 9,950,424 B2 | 4/2018 | Roberts |
| 10,005,180 B2 | 6/2018 | Roberts |
| 10,407,184 B2 | 9/2019 | Mori |
| 10,577,130 B1 | 3/2020 | Parish |
| 11,104,459 B2 | 8/2021 | Sorensen |
| 2001/0017337 A1 | 8/2001 | Holemans |
| 2002/0063188 A1 | 5/2002 | Steinsiek |
| 2003/0192995 A1 | 10/2003 | Tchoryk |
| 2004/0026571 A1 | 2/2004 | Scott |
| 2004/0245404 A1 | 12/2004 | Kerstein |
| 2005/0001102 A1 | 1/2005 | Schubert |
| 2005/0040282 A1 | 2/2005 | Wingo |
| 2005/0103940 A1 | 5/2005 | Bischof |
| 2005/0258311 A1 | 11/2005 | Scott |
| 2006/0145023 A1 | 7/2006 | Babb |
| 2006/0145024 A1 | 7/2006 | Kosmas |
| 2006/0151671 A1 | 7/2006 | Kosmas |
| 2007/0114334 A1 | 5/2007 | D'Ausilio |
| 2007/0164164 A1 | 7/2007 | Cepollina |
| 2007/0210212 A1* | 9/2007 | Tchoryk ............... B64G 1/646 244/172.4 |
| 2007/0228219 A1 | 10/2007 | Behrens |
| 2007/0228220 A1 | 10/2007 | Behrens |
| 2008/0060460 A1 | 3/2008 | Smith |
| 2008/0121759 A1 | 5/2008 | Behrens |
| 2008/0237400 A1 | 10/2008 | Gryniewski |
| 2008/0265098 A1 | 10/2008 | Connelly |
| 2009/0001221 A1 | 1/2009 | Collyer |
| 2009/0146011 A1 | 6/2009 | Ritter |
| 2009/0173832 A1 | 7/2009 | Hays |
| 2009/0173833 A1 | 7/2009 | Ritter |
| 2011/0004717 A1 | 1/2011 | Ritter |
| 2011/0008102 A1 | 1/2011 | Hays |
| 2011/0121139 A1 | 5/2011 | Poulos |
| 2011/0180670 A1 | 7/2011 | Robert |
| 2011/0192936 A1 | 8/2011 | Knirsch |
| 2012/0112009 A1 | 5/2012 | Gryniewski |
| 2012/0286098 A1 | 11/2012 | Poulos |
| 2012/0325972 A1 | 12/2012 | Gryniewski |
| 2013/0103193 A1 | 4/2013 | Roberts |
| 2013/0292516 A1 | 11/2013 | Celerier |
| 2014/0027577 A1 | 1/2014 | Darooka |

(56) References Cited

U.S. PATENT DOCUMENTS

| | | |
|---|---|---|
| 2014/0361123 A1 | 12/2014 | Celerier |
| 2015/0008288 A1 | 1/2015 | Bigelow |
| 2015/0008290 A1 | 1/2015 | Bigelow |
| 2015/0053823 A1 | 2/2015 | Bigelow |
| 2015/0097084 A1 | 4/2015 | Szabo |
| 2015/0314893 A1 | 11/2015 | Rembala |
| 2016/0039543 A1 | 2/2016 | Roberts |
| 2016/0039544 A1 | 2/2016 | Roberts |
| 2016/0257435 A1 | 9/2016 | Coraboeuf |
| 2017/0113818 A1 | 4/2017 | Mori |
| 2017/0129627 A1 | 5/2017 | Moro |
| 2017/0342943 A1 | 11/2017 | Watts |
| 2018/0087683 A1 | 3/2018 | Raven |
| 2018/0118377 A1 | 5/2018 | Garber |
| 2018/0148197 A1 | 5/2018 | Halsband |
| 2018/0186476 A1 | 7/2018 | Poncet |
| 2018/0251240 A1 | 9/2018 | Reitman |
| 2018/0251242 A1 | 9/2018 | Gorakavi |
| 2018/0297722 A1 | 10/2018 | Agathon-Burton |
| 2018/0297723 A1 | 10/2018 | Sorensen |
| 2019/0023420 A1 | 1/2019 | Nicholson |
| 2019/0023421 A1 | 1/2019 | Nicholson |
| 2019/0023422 A1 | 1/2019 | Nicholson |

FOREIGN PATENT DOCUMENTS

| | | |
|---|---|---|
| CN | 105501470 A | 4/2016 |
| CN | 107697320 A | 2/2018 |
| EP | 0541052 A1 | 5/1993 |
| EP | 0937644 A2 | 8/1999 |
| EP | 2134606 A1 | 12/2009 |
| EP | 0741655 B2 | 5/2010 |
| EP | 1654159 B1 | 6/2010 |
| EP | 2522577 A1 | 11/2012 |
| EP | 3083406 B1 | 2/2017 |
| EP | 3156335 A1 | 4/2017 |
| EP | 3186151 A1 | 7/2017 |
| EP | 3248737 B1 | 12/2018 |
| JP | H01282098 A | 11/1989 |
| JP | H02182599 A | 7/1990 |
| JP | 2013121126 A | 6/2013 |
| KR | 20000004560 A | 1/2000 |
| KR | 101808553 B1 | 12/2017 |
| WO | 1987004992 A1 | 8/1987 |
| WO | 1994029927 A1 | 12/1994 |
| WO | 2005110847 A1 | 11/2005 |
| WO | 2005118394 A1 | 12/2005 |
| WO | 2008109993 A1 | 9/2008 |
| WO | 2014024199 A1 | 2/2014 |
| WO | 2015190527 A1 | 12/2015 |
| WO | 2016030890 A1 | 3/2016 |
| WO | 2016181079 A1 | 11/2016 |

OTHER PUBLICATIONS

Fehse "Automated Rendezvous and Docking of Spacecraft", 15 pages, Cambridge University Press 2003.

IBOSS—a modular approach towards enhanced future space systems and flexibility, http://www.iboss-satellites.com/iboss/, http://exchange.ciros-engineering.com/download/public/iBOSS_IAC-2017.wmv.

International PCT Application No. PCT/US2021/023372, Written Opinion filed Jun. 17, 2021, 7 pp.

International PCT Application No. PPCT/US2021/023372 International Search Report, dated Jun. 17, 2021, 4 pp.

Medina et al., "Towards a standardized grasping and refuelling on-orbit servicing for geo spacecraft", Acta Astronautica, vol. 134, 2017, pp. 1-10.

Mukherjee, "Robotic Assembly of Space Assets; Architectures and Technologies" Future In-Space Operations (FISO) Teleconference, Jun. 27, 2018, 2018 NASA Jet Propulsion Laboratory California Institute of Technology, 41 pages.

Reintsema et al., "DEOS—The In-Flight Technology Demonstration of Germansrobotics Approach to Dispose Malfunctioned Satellites", 2010, 8 pages.

Sellmaier et al., "On-Orbit Servicing Missions: Challenges and Solutions for Spacecraft Operations", SpaceOps 2010 Conference, AIAA 2010-2159, 2010.

Weise et al., "An Intelligent Builging Blocks Concept for On-Orbit-Satellite Servcing", Turin, Italy, 4-6 Sep. 2-12, 8 pages.

* cited by examiner

VEHICLE CAPTURE ASSEMBLIES AND RELATED DEVICES, SYSTEMS, AND METHODS

CROSS-REFERENCE TO RELATED APPLICATIONS

This application is a continuation of U.S. patent application Ser. No. 17/207,644, filed Mar. 20, 2021, for "VEHICLE CAPTURE ASSEMBLIES AND RELATED DEVICES, SYSTEMS, AND METHODS," which application claims the benefit of the filing date of U.S. Provisional Patent Application Ser. No. 63/019,891, filed May 4, 2020, for "VEHICLE CAPTURE ASSEMBLIES AND RELATED DEVICES, SYSTEMS, AND METHODS," the disclosure of each of which is incorporated herein in its entirety by reference.

TECHNICAL FIELD

The present disclosure relates to systems, devices, assemblies, apparatus, and methods for vehicle (e.g., spacecraft) docking. In some embodiments, the present disclosure includes a vehicle capture assembly including attenuation features and/or probe movement features for engaging with an associated vehicle and related devices, systems, and methods.

BACKGROUND

Docking assemblies and devices may be utilized to mechanically connect two or more vehicles (e.g., spacecraft) to each other. Such spacecraft may be vehicles (e.g., self-propelled vehicles) designed for short-term space flights and/or may be configured to remain in space for a long period of time. The spacecraft may be intended to perform a specific function in a space mission, such as supplying resources to and/or altering the orbit of a target vehicle. In some instances, the spacecraft may be a space station, satellite, or another suitable structure.

The connection of two or more spacecraft may enable the transfer of resources from one spacecraft to another spacecraft. For example, a spacecraft may dock with a space station to deliver crew and resources. In another example, a spacecraft may dock with a satellite to perform maintenance and repair of one or more components of that satellite. In yet an additional example, a spacecraft may dock with another vehicle to provide a specific mission function, such as, for example, a descent to or an ascent from an astronomical body or to transfer to a select location for the mission.

Conceptualized methods of docking to spacecraft consist of complex mechanical implements. Various patents and publications have considered such methods, including U.S. Pat. Nos. 3,508,723, 4,018,409, 4,177,964, 4,219,171, 4,391,423, 4,588,150, 4,664,344, 4,898,348, 5,005,786, 5,040,749, 5,094,410, 5,299,764, 5,364,046, 5,372,340, 5,490,075, 5,511,748, 5,735,488, 5,803,407, 5,806,802, 6,017,000, 6,299,107, 6,330,987, 6,484,973, 6,523,784, 6,742,745, 6,843,446, 6,945,500, 6,969,030, 7,070,151, 7,104,505, 7,207,525, 7,216,833, 7,216,834, 7,240,879, 7,293,743, 7,370,834, 7,438,264, 7,461,818, 7,484,690, 7,513,459, 7,513,460, 7,575,199, 7,588,213, 7,611,096, 7,611,097, 7,624,950, 7,815,149, 7,823,837, 7,828,249, 7,857,261, 7,861,974, 7,861,975, 7,992,824, 8,006,937, 8,006,938, 8,016,242, 8,033,508, 8,056,864, 8,074,935, 8,181,911, 8,196,870, 8,205,838, 8,240,613, 8,245,370, 8,333,347, 8,412,391, 8,448,904, 8,899,527, 9,108,747, 9,302,793, 9,321,175, and 9,399,295; U.S. Patent Application Pub. Nos. 2004/0026571, 2006/0145024, 2006/0151671, 2007/0228220, 2009/0001221, 2012/0112009, 2012/0325972, 2013/0103193, 2015/0008290, 2015/0314893, 2016/0039543, and 2016/0039544; European Patent Nos. EP 0092602 A1, EP 0541052, 0741655 B1, 0741655 B2, and 1654159; PCT Pub. Nos. 2005/110847, 2005/118394, 2014/024,199, and 2016/030890; Japan Patent Nos. JPH01282098 and JPH01226497; *Automated Rendezvous and Docking of Spacecraft*, Fehse, Wigbert, Cambridge University Press (2003); *On-Orbit Servicing Missions: Challenges and Solutions for Spacecraft Operations*, Sellmaier, F., et al., SpaceOps 2010 Conference, AIAA 2010-2159 (2010); and *Towards a standardized grasping and refueling on-orbit servicing for geo spacecraft*, Medina, Alberto, et al., Acta Astronautica vol. 134, pp. 1-10 (2017); DEOS—The In-Flight Technology Demonstration of German's Robotics Approach to Dispose Malfunctioned Satellites, Reintsema, D., et al., the disclosure of each of which is hereby incorporated herein in its entirety by this reference.

However, mechanical complexity that is present in many of the above designs, particularly complexity associated with multi-axis servo motor and robotic control systems, increases the likelihood of component failure, which can result in failure in the docking and maintenance process. Further, relative motion between the docked vehicles and applied to the vehicles and the docking assemblies may jeopardize the docking procedure and may also cause damage to one or more of the vehicles and their respective docking assemblies.

BRIEF SUMMARY

Some embodiments of the disclosure may include a vehicle capture assembly comprising a probe assembly including one or more retention elements for engaging with and securing a target vehicle and a probe movement feature coupled to at least a portion of the probe assembly. The probe movement feature comprises at least one movable union for mounting the vehicle capture assembly to the capture vehicle, the at least one movable union to enable the probe assembly to move in at least one degree of freedom relative to the capture vehicle and at least one attenuation feature (e.g., passively acting attenuation feature) to dampen movement of the probe assembly relative to the capture vehicle.

Some embodiments of the disclosure may include a spacecraft capture system comprising two or more vehicle capture assemblies. The vehicle capture assemblies each include a probe assembly including one or more retention elements for engaging with and securing a target spacecraft, an extendable lance coupled to the probe assembly at a distal portion of the lance, a mounting platform for coupling to the capture vehicle, and at least one movable joint to enable the probe assembly and the extendable lance to move in at least one degree of freedom relative to the capture vehicle. The two or more vehicle capture assemblies may be configured to substantially simultaneously retract each respective probe assembly of the two or more vehicle capture assemblies in order to secure the target spacecraft.

Some embodiments of the disclosure may include a method of capturing a spacecraft including extending a probe of a vehicle capture assembly toward a target spacecraft, the vehicle capture assembly being coupled to a capture vehicle; enabling motion (e.g., translation and/rotation) of the vehicle capture assembly relative to the capture vehicle; dampening the motion of the vehicle capture assembly with an attenuation assembly; and engaging the probe of the vehicle capture assembly with the target spacecraft.

Some embodiments of the disclosure may include one or more probe assemblies that are configured to be received in a respective structure (e.g., one or more capture cones) on a target vehicle. Retention features on the one or more probe assemblies may enable movement of the probe assembly to provide an approximate universal joint between the one or more probe assemblies and the target vehicle.

Some embodiments of the disclosure may include one or more probe assemblies that each include an attenuation structure or platform where the attenuation structure or platform may provide an effective universal joint and a prismatic joint between the capture vehicle and the probe and/or target vehicle. When implemented with the movable target vehicle retention features above, the overall structure may provide a universal joint, a prismatic joint, and an approximate universal joint along the path between vehicles. For example, three probe assemblies and three capture cones may define such a joint configuration in space (e.g., in situ) during a docking procedure that approximates a 3-UPU (universal-prismatic-universal) manipulator.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
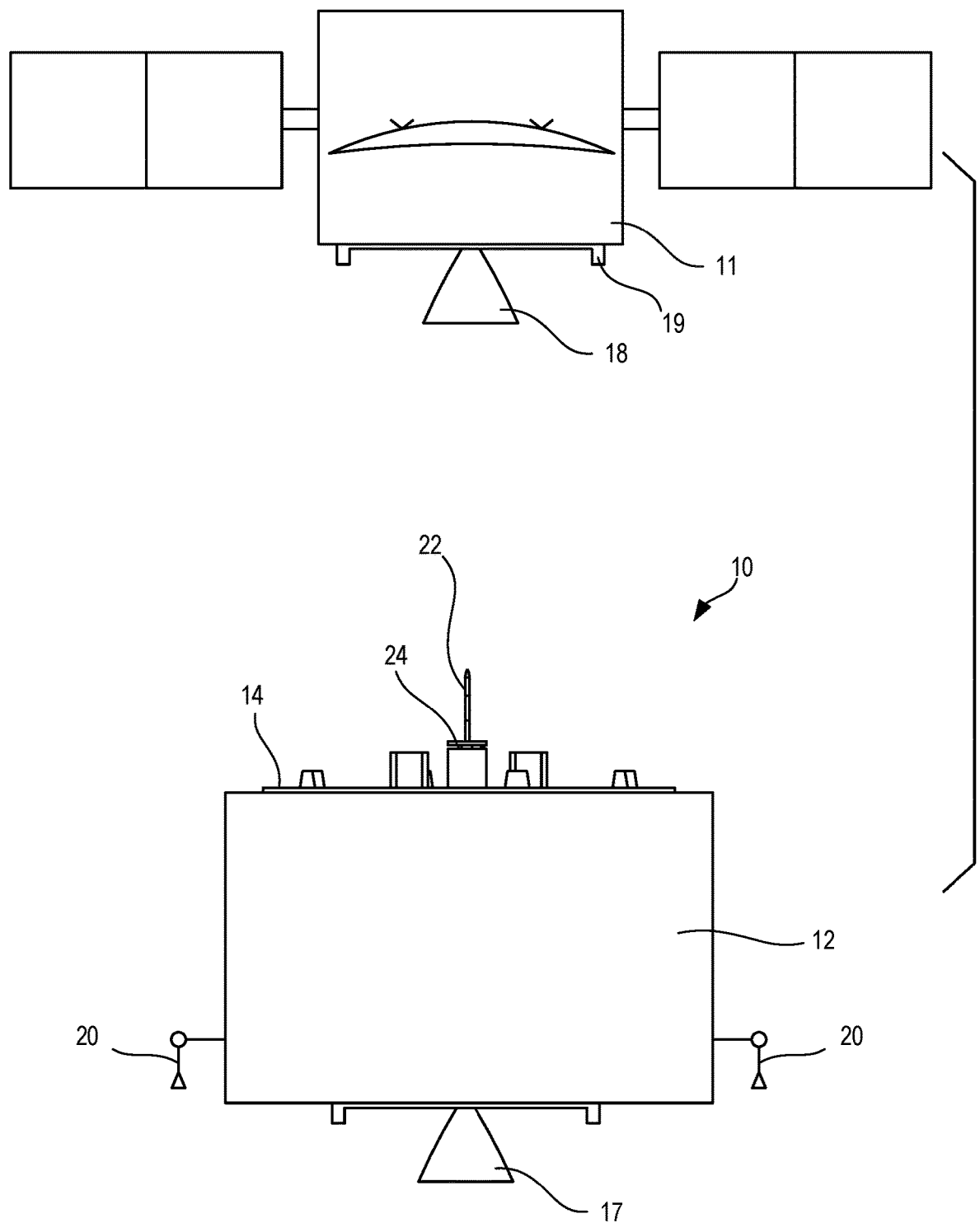
FIG. 1 is a schematic side view of a capture vehicle with a vehicle capture assembly and a target vehicle according to one or more embodiments of the disclosure.

While the disclosure is amenable to various modifications and alternate forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure.

DETAILED DESCRIPTION

As used herein, the terms "substantially," "about," and "approximate," in reference to a given parameter, means and includes to a degree that one skilled in the art would understand that the given parameter, property, or condition is met with a small degree of variance, such as within acceptable manufacturing tolerances. For example, a parameter that is substantially, about, or approximately met may be at least about 90% met, at least about 95% met, at least about 99% met, or even 100% met.

Embodiments of the present disclosure may include capture and mating assemblies and systems used for mechanical docking of two or more vehicles (e.g., spacecraft in orbit, with or without self-propulsion), using one or more vehicle capture assemblies (e.g., two or more, three, four, etc.) on the capture vehicle. The vehicle capture assemblies are configured to engage with a docking portion of a target vehicle to be captured (e.g., one or more docking cones coupled to the target vehicle). Some embodiments may enable the autonomous capture and docking of spacecraft with relatively large mass and inertia, while incurring minimal disturbance to either vehicle. Some embodiments provide benefits in the form of a relatively simple docking architecture with compliancy for improved reliability and safety, that is, preventing damage to the spacecraft.

Some embodiments may reduce the probability of damage to the vehicles and their respective components during a docking procedure. For example, a docking assembly in accordance with embodiments of the disclosure may provide near-zero relative disturbance docking. In particular, a passive attenuation platform of the docking assembly may include one or more movable joints or unions (e.g., rotational and/or translation union or joints) enabling the docking assembly to move relative to a capture vehicle on which the docking assembly is mounted. The passive attenuation platform may include one or more attenuation elements or features (e.g., struts, which may be adjustable or tunable) to assist in dampening movement of the docking assembly (e.g., with the target vehicle at least partially coupled thereto) relative to the capture vehicle. Such docking assemblies may provide initial compliance for soft capture and/or may at least partially attenuate relative motion between the vehicles (e.g., before retraction of the docking assembly to a final rigidized connection). As noted above, in some embodiments, each docking assembly (e.g., three docking assemblies) may provide the combination of a universal joint, a prismatic joint, and an approximate universal joint (e.g., a 3-UPU (universal-prismatic-universal) manipulator) when coupled with a respective number of capture cones in space (e.g., in situ) during a docking procedure. In some embodiments, the 3-UPU may comprise combination of a universal joint, a prismatic joint, and an approximate universal joint, for example, a spherical joint.

FIG. 1 depicts a schematic side view in which a capture vehicle 10 (e.g., a servicing vehicle, a chaser spacecraft, a transfer spacecraft, etc.) may be operated to approach, capture, dock to, supply, transfer cargo or resources to, and/or service a target vehicle 11, according to one or more embodiments of the disclosure.

Capture vehicle 10 and target vehicle 11 each may be a spacecraft or a satellite situated in orbit around a body. The capture vehicle 10 may be a spacecraft designed to approach, capture, dock to, and undock from the target vehicle 11. Docking of the capture vehicle 10 to target vehicle 11 may enable a specific function in a space mission. For example, the connection of the vehicles 10, 11 may enable the transfer of resources (e.g., cargo, equipment, passengers, crew, etc.) from one vehicle to another vehicle, may enable vehicle repair, and/or may enable a specific mission function (e.g., a descent to or an ascent from an astronomical body or to transfer to a select location in space for the mission).

Capture vehicle 10 may be designed to dock with more than one target vehicle 11. For example, the capture vehicle 10 may be provided with a docking mechanism (e.g., vehicle capture assembly 22) that enables the capture vehicle 10 to dock and undock from multiple target vehicles 11. The capture vehicle 10 may be configured to dock with one or more of the target vehicles 11 comprising one or more docking elements 18 (e.g., a docking cone, an engine, etc.).

As discussed below in greater detail, the vehicle capture assembly 22 may include an attenuation platform 24 including one or more attenuation elements or features (e.g., struts) to assist in enabling movement of the vehicle capture assembly 22 relative to the capture vehicle 10 while also dampening such movement of the vehicle capture assembly 22 (e.g., with the target vehicle 11 at least partially coupled thereto) relative to the capture vehicle 10. The vehicle capture assembly 22 and the attenuation platform 24 may provide initial compliance for soft capture of the target vehicle 11 and/or may at least partially attenuate relative motion between the vehicles 10, 11 (e.g., before retraction of the vehicle capture assembly 22 to a final rigidized connection).

In some embodiments, the attenuation platform 24 may be passive. For example, the attenuation platform 24 may function in a manner that does not require the use of active components such as a motor directly actuating the attenuation platform 24 (e.g., is not required to be driven in an active manner). The attenuation platform 24 may use passive methodology or mechanisms, such as mechanical forces (e.g., biasing member, struts, etc.) to dampen movement of the vehicle capture assembly 22. In additional embodiments, the attenuation platform 24 may include active (e.g., actively driven) components enabling and/or regulating motion in one or more of the degrees of freedom.

As depicted, the capture vehicle 10 may include a spacecraft body 12, a docking platform 14, a main thruster 17, gimbaled thrusters 20, and the vehicle capture assembly 22. As noted above, the vehicle capture assembly 22 may include retention elements that directly contact and secure the target vehicle 11 in a manner that does not require the use of active components such as a motor directly actuating the retention elements. Rather, the retention elements may use passive methodology or mechanisms, such as mechanical forces (e.g., biasing forces), to engage with the target vehicle 11.

Mechanical forces (e.g., biasing forces) may be used to release (e.g., nondestructively release) the retention elements to move the retention elements toward a stowed or disengaged position in order to release the target spacecraft 11 without the use of a motor directly driving the retention elements. Such embodiments may reduce, or even eliminate, the need for electronic components (e.g., signal conductors, electrical wiring, power systems, switches, motor, heaters, thermistors, helical harnesses, etc.) in portions of the vehicle capture assembly 22 (e.g., in a lance and/or probe of the vehicle capture assembly 22).

As discussed below, while a motor (e.g., only a single and solitary motor) may be used to actively move (e.g., translate) the vehicle capture assembly 22 toward and/or away from the target vehicle 11, such a motor may only indirectly contribute to the engagement and/or disengagement of the retention elements. For example, while the motor may place the retention elements in a selected position relative to the target vehicle, a force applied to the vehicle capture assembly 22 may be utilized to engage and/or disengage the retention elements (e.g., a force overcoming one or more biasing elements of the vehicle capture assembly 22) in a passive manner that is not actively driven by a motor or an otherwise electronic device.

Target vehicle 11 may be a spacecraft to be captured by the vehicle capture assembly 22 of the capture vehicle 10. Target vehicle 11 may be in low earth orbit, medium earth orbit, geosynchronous orbit, beyond geosynchronous orbit, or in another orbit around an astronomical body, for example, such as Earth, the moon, or another planetary body. Target vehicle 11 may include the docking element 18 and a separation ring 19.

Vehicle capture assembly 22 of capture vehicle 10 may be configured to capture target vehicle 11 at docking element 18 and to pull target vehicle 11 and capture vehicle 10 together for docking. When docked, one or more portions of the target vehicle 11 and/or vehicle capture assembly 22 may abut and retain the vehicles 10, 11 together.

Figure 2:
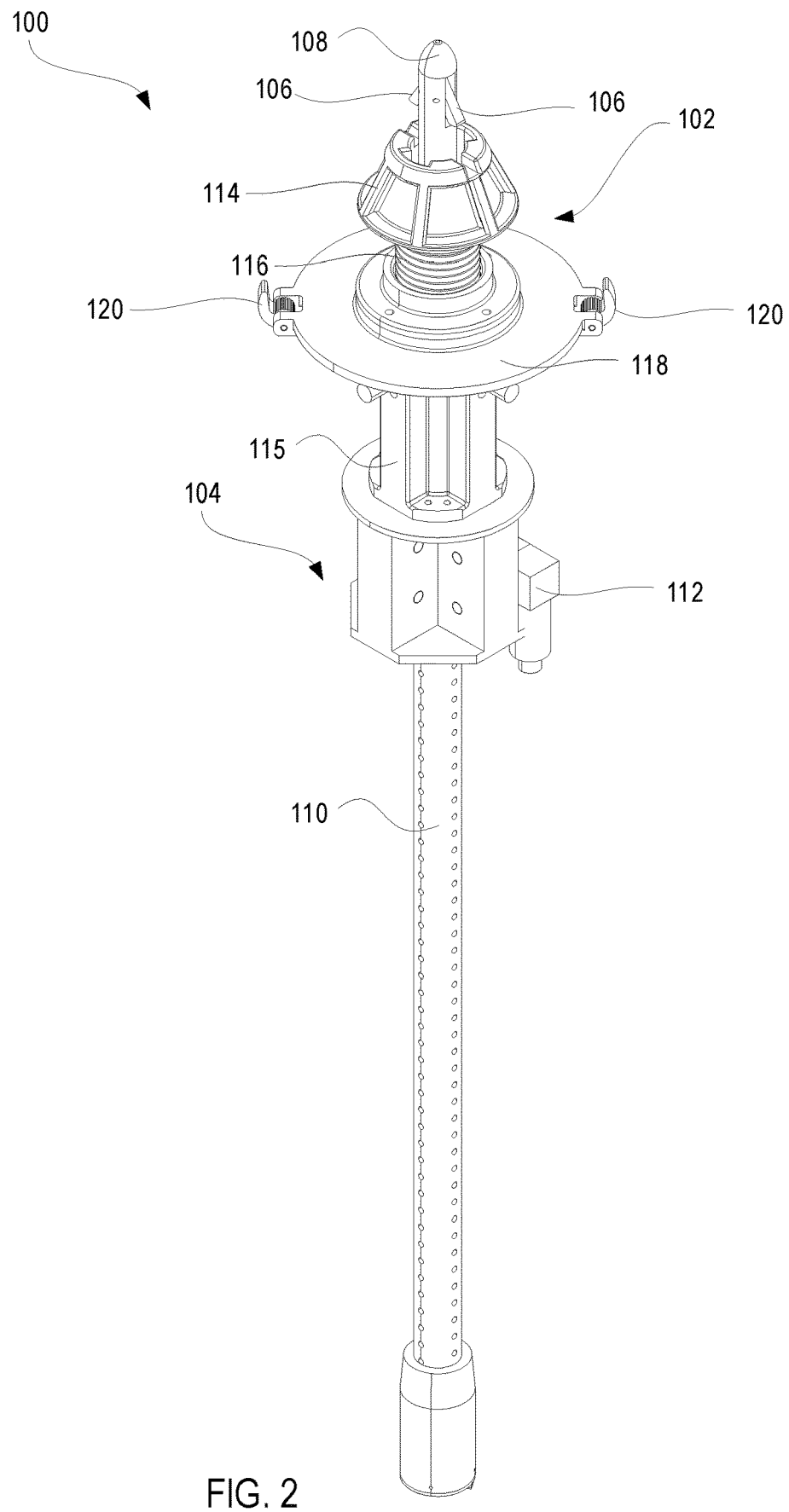
FIG. 2 is an isometric view of a vehicle capture assembly in an initial position according to one or more embodiments of the disclosure.

FIG. 2 depicts an isometric view of a vehicle capture assembly 100 in an initial position that may be used with a capture vehicle. In some embodiments, vehicle capture assembly 100 may be similar to, and include similar components and features of, the vehicle capture assembly 22 of the capture vehicle 10 which is depicted schematically in FIG. 1 and discussed above.

As shown in FIG. 2, the vehicle capture assembly 100 includes a probe or probe assembly 102 coupled to a lance or lance assembly 104 (e.g., at a distal portion or end of the lance assembly 104). The probe assembly 102 includes one or more retention features (e.g., barbs 106) that extend from the probe assembly 102 at a location proximate a probe tip 108. The barbs 106 may extend in a direction transverse to a length or longitudinal axis of one or more portions of the vehicle capture assembly 100 (e.g., lateral to a length of the lance assembly 104). As depicted, the rotatable barbs 106 extend laterally outward and in a proximal direction toward the lance assembly 104 in order to capture a target vehicle 11 (FIG. 1).

In some embodiments, the barbs 106 may be biased (e.g., spring-loaded) in a selected position. For example, the barbs 106 may be in the depicted deployed position where the barbs 106 may couple with a portion of the target vehicle 11 (FIG. 1). In additional embodiments, the barbs 106 may be biased in a retracted or stowed position.

Referring to FIGS. 1 and 2, the lance assembly 104 may include functionality that enables extension and/or retraction of a portion of probe assembly 102 to facilitate docking of capture vehicle 10 with target vehicle 11. For example, when capture vehicle 10 is positioned proximate to the target vehicle 11, the probe assembly 102 may be extended to and inserted into the docking element 18 of the target vehicle 11 with the lance assembly 104. The lance assembly 104 may include a lance boom 110 that is driven by a motor 112 positioned in a housing 115 of the probe assembly 102. The motor 112 may be used to actively move (e.g., translate) the lance boom 110 toward and/or away from the target vehicle 11.

In some embodiments, the motor 112 may only indirectly contribute to the engagement and/or disengagement of the barbs 106. For example, while the motor 112 may place the barbs 106 in a selected position relative to the target vehicle 11, force applied to the barbs 106 (e.g., to overcome the biasing force of the barbs 106 into the deployed position) may be applied as the barbs 106 are inserted into the docking element 18 to engage the barbs 106 in a passive manner that is not actively driven by the motor 112. As discussed below, movement of the probe assembly 102 (e.g., by forcing the probe assembly 102 into the target vehicle 11) may be used to release the barbs 106 from the target vehicle 11 (e.g., by overcoming the biasing forces of the barbs 106 in a different manner with internal components of the probe assembly 102).

The vehicle capture assembly 100 may include another rearward element (e.g., docking cone 114) for engaging another portion of the target vehicle 11 (e.g., another portion of the docking element 18). As depicted, docking cone 114 may be biased toward the barbs 106 (e.g., by spring 116) in order to secure the target vehicle between the barbs 106 and the docking cone 114.

The vehicle capture assembly 100 may include a backstop plate 118 for mating with a portion of the target vehicle 11 (e.g., in the captured position). One or more additional retention elements (e.g., latches 120) may be coupled (e.g., rotatably coupled) to the backstop plate 118. Additional embodiments may include a linkage-type latch. In the captured position, the latches 120 may be actuated to engage with the docking element 18 to secure the target vehicle 11. In some embodiments, after engagement, the latches 120 may comprise a majority of the rigid connection between the vehicles 10, 11 (e.g., may be the primary connection). For example, the latches 120 may bear a majority of the forces developed between the two vehicles 10, 11 while the other attachment points (e.g., the docking cone 114 and/or the barbs 106) are not primarily used or experience a significantly lower amount of force (e.g., by one or more orders of magnitude).

Figure 3:
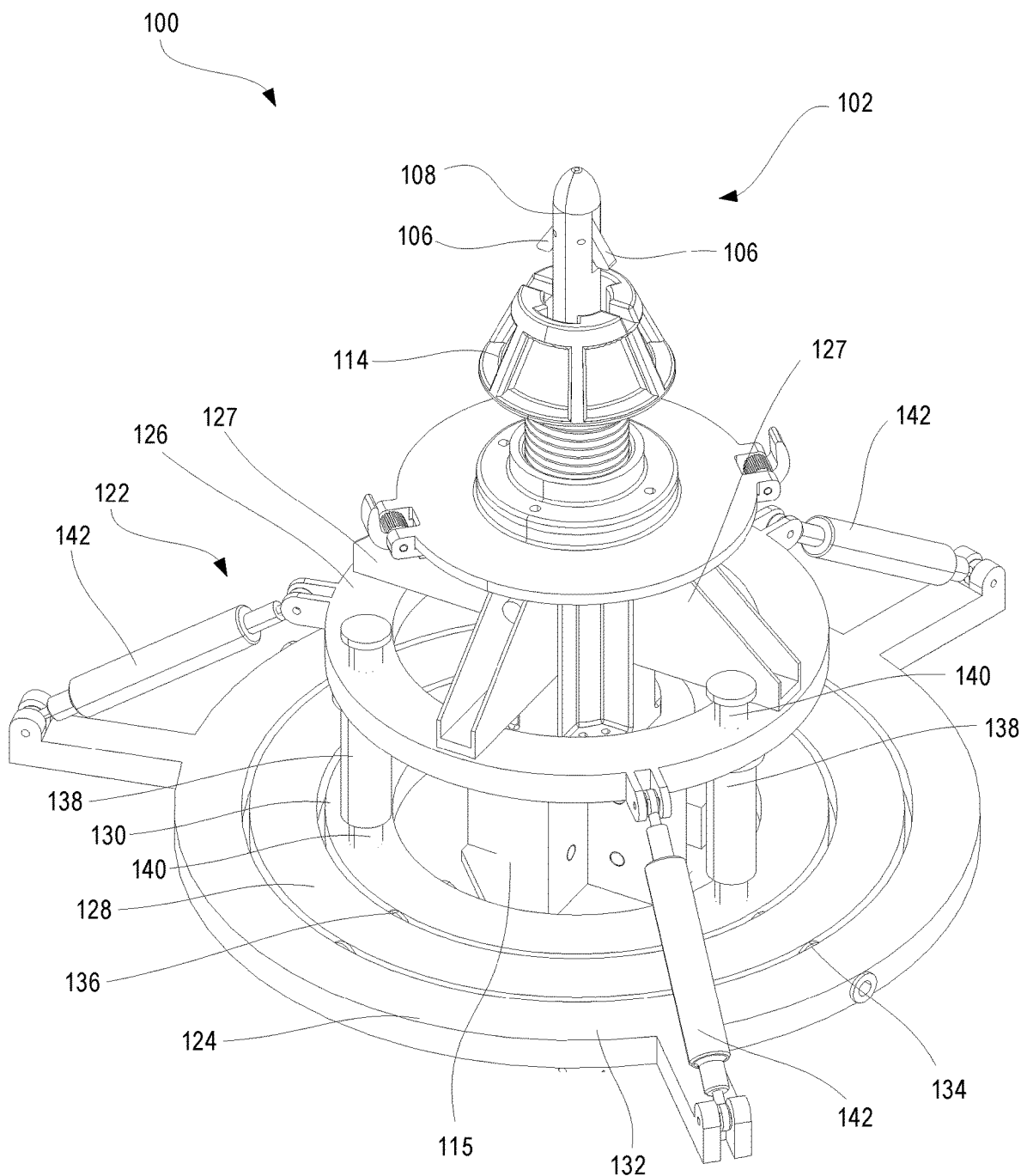
FIG. 3 is an isometric view of a vehicle capture assembly including a probe movement feature according to one or more embodiments of the disclosure.

FIG. 3 is an isometric view of a vehicle capture assembly (e.g., vehicle capture assembly 100). As shown in FIG. 3, the vehicle capture assembly 100 includes a probe movement feature (e.g., an attenuation platform 122). In some embodiments, the attenuation platform 122 may be similar to the attenuation platform 24 discussed above.

As depicted, the attenuation platform 122 may include a first platform 124 and a second platform 126. The first platform 124 may be coupled (e.g., rigidly coupled in an immovable manner) to the capture vehicle 10 (FIG. 1). The second platform 126 may be coupled (e.g., rigidly coupled) to the vehicle capture assembly 100 (e.g., to the housing 115) via one or more brackets 127.

The second platform 126 may be movably coupled to the first platform 124 via one or more movable unions or joints to enable the second platform 126 to move relative to both the first platform 124 and the capture vehicle 10. Each of the movable unions may provide at least one degree of freedom (e.g., rotational and/or translational) of movement between the second platform 126 and the first platform 124.

For example, the attenuation platform 122 may include a number of rotational members (e.g., a first gimbal ring 128 and a second gimbal ring 130) mounted to a fixed portion (e.g., fixed, outer ring 132) of the first platform 124 (e.g., by pinned connections 134, 136). The first gimbal ring 128, the second gimbal ring 130, and the fixed, outer ring 132 may define a gimbal assembly providing two degrees of rotational movement. For example, the first gimbal ring 128 may enable the vehicle capture assembly 100 to rotate about a first axis of movement. The second gimbal ring 130 may enable the vehicle capture assembly 100 to rotate about a second axis of movement. The second axis may be positioned in a transverse direction to (e.g. perpendicular to) the first axis. For example, as oriented in FIG. 3, the first and second axes may be an x-axis and a z-axis (e.g. two horizontal axes). As depicted, the pinned connections 134, 136 may be offset by about 90 degrees to enable rotation about two substantially orthogonal axes.

The attenuation platform 122 may include a number of translational members (e.g., sleeves 138 and rods 140) that define one or more prismatic joints or unions enabling one or more translational degrees of freedom (e.g., enabling pure translational movement). For example, the sleeves 138 and the rods 140 (e.g., three of each) may all move in a similar direction to provide one degree of translational freedom along a third axis. As depicted, the third axis may be positioned in a transverse direction to (e.g., perpendicular to) both of the first and second axes. As oriented in FIG. 3, the third axis may be a y-axis (e.g., a vertical axis).

In some embodiments, the first gimbal ring 128 and the second gimbal ring 130 may operate as an approximate universal joint. Once the capture vehicle 10 (FIG. 1) and the target vehicle 11 (FIG. 1) are joined, the attenuation platform 122 may enable the synchronization of velocities of the vehicles (e.g., in six degrees of freedom, for example, where three or more attenuated connections are made with the vehicle capture assemblies 100) and may minimize any rate differences (e.g., velocity rates) between the vehicles 10, 11.

In some embodiments, where multiple vehicle capture assemblies 100 are utilized (e.g., three vehicle capture assemblies 100), the combination of the vehicle capture assemblies 100 coupled to respective docking assemblies 18 of the target vehicle 11 (FIG. 1) may approximate another universal joint to provide attenuation of movement and/or forces between the vehicles 10, 11. For example, both the barbs 106 (e.g., three barbs) and an inner portion of the docking assembly 18 with which a distal end of the barbs 106 engage may comprise complementary surfaces. In some embodiments, both the barbs 106 and the inner portion of the docking assembly 18 may define at least partially spherical surfaces that enable the barbs 106 to move (e.g., slide along) an inner surface of the docking assembly 18 to provide the approximate universal joint.

While certain embodiments discussed herein are directed to the attenuation platform 122 having three degrees of freedom (e.g., one translational and two rotational), other embodiments may include other variations of degrees of freedom, both rotational and translational (e.g., one to three of each).

The attenuation platform 122 may include a number of biasing and/or dampening members (e.g., passively operating mechanical biasing and dampening members, such as three struts 142). Additional embodiments may include other numbers of biasing and/or dampening members (e.g., one to nine members, which may be adjustable). The struts 142 (e.g., including mechanical biasing mechanisms, such as springs, and/or hydraulic dampening mechanisms) may be positioned about the attenuation platform 122 (e.g., in a ring at 120-degree intervals) and may be coupled between the first platform 124 and the second platform 126.

The struts 142 may act to dampen both rotational and translational movement of the vehicle capture assembly 100. That is, the struts 142 may allow some movement of the vehicle capture assembly 100 while dampening or attenuating the movement. For example, rotation of the first gimbal ring 128 and the second gimbal ring 130 may enable a distal end of the vehicle capture assembly 100 to move back or forth in a lateral direction (e.g., relative to a length or longitudinal axis of the vehicle capture assembly 100 or a centerline of the capture vehicle 10) while the struts 142 dampen the rotation required to move the vehicle capture assembly 100. Likewise, the sleeves 138 and the rods 140 may enable the vehicle capture assembly 100 to move along a length or longitudinal axis of the vehicle capture assembly 100 toward and away from the capture vehicle 10 while the struts 142 dampen the translation of the vehicle capture assembly 100.

In some embodiments, the struts 142 may bias the vehicle capture assembly 100 in an initial position such that the struts 142 dampen the movement of the vehicle capture assembly 100 deviating from the initial position and tend to force the vehicle capture assembly 100 back to its original orientation in the initial position. For example, the struts 142 may return the vehicle capture assembly 100 to a position perpendicular to one or more of the first platform 124, the second platform 126, or surface of the capture vehicle 10 to which the attenuation platform 122 is mounted. The struts 142 may return the vehicle capture assembly 100 to a position relatively further away from the capture vehicle 10.

In some embodiments, the struts 142 may attenuate movement during a docking procedure. For example, the struts 142 may dampen transitional forces between the vehicles 10, 11 (FIG. 1) as the docking assembly 100 is inserted in a docking cone of the target vehicle 11.

Figure 4:
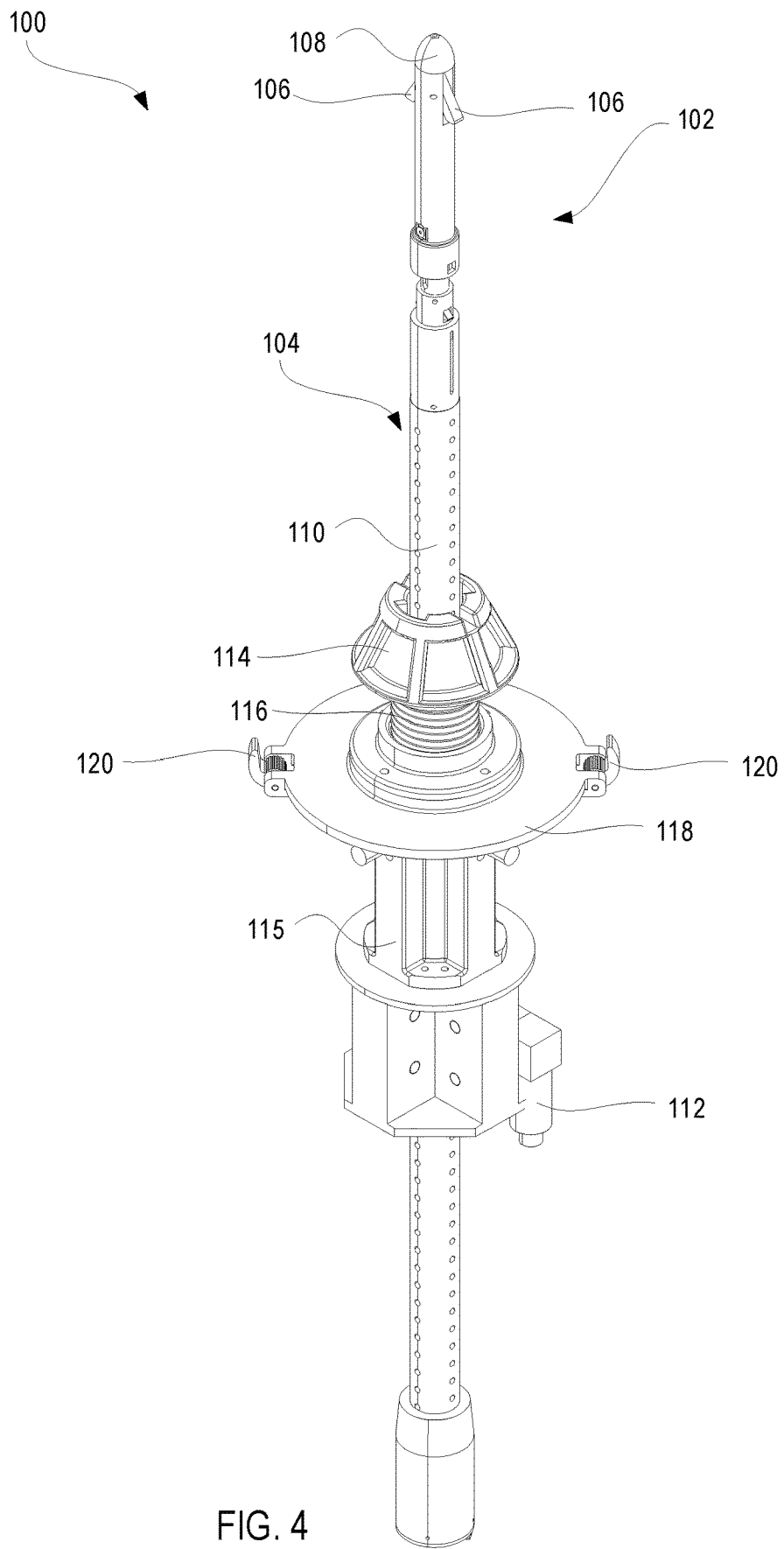
FIG. 4 is an isometric view of a vehicle capture assembly in an extended or extending position according to one or more embodiments of the disclosure.
Figure 5:
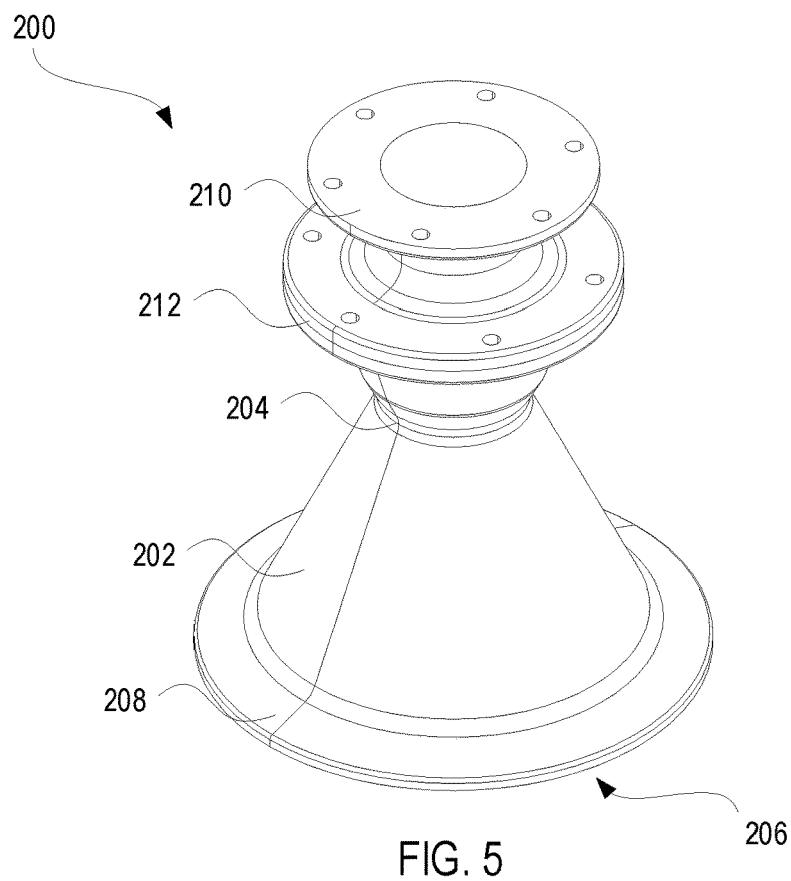
FIG. 5 is an isometric view of a docking assembly according to one or more embodiments of the disclosure.

FIG. 4 is an isometric view of a vehicle capture assembly (e.g., vehicle capture assembly 100) in an extended or extending position. FIG. 5 is an isometric view of a docking assembly 200 for a target vehicle 11 (FIG. 1).

Referring to FIG. 1 through 5, in operation, the vehicle capture assembly 100 may be positioned in the initial state shown in FIGS. 2 and 3. In some embodiments, the vehicle capture assembly 100 may move to the initial state from a stowed state (e.g., used during transport). In the stowed state, the probe tip 108 and barbs 106 may position (e.g., compress) the probe tip 108 and docking cone 114 toward or in contact with the backstop plate 118.

From the initial position, the lance motor 112 may translate the probe assembly 102 toward the target vehicle 11 (e.g., toward the docking assembly 200) to the extended or extending position shown in FIG. 4. The lance motor 112 and/or the capture vehicle 10 may move (e.g., force) the probe tip 108 through an outer cone 202 of the docking assembly 200, through a necked portion 204, and into an inner volume 206 of the docking assembly 200. As the probe tip 108 passes through the necked portion 204, biasing force of the barbs 106 may be overcome by the force of the insertion. The barbs 106 may at least partially retract to pass through the necked portion 204 and may be returned to a deployed or expanded position once in the inner volume 206 to initially capture the target vehicle 11.

After initial contact and capture, the attenuation platform 122 may enable the vehicle capture assembly 100 to move with the target vehicle 11 while attenuating the relative motion and/or velocities between the vehicles 10, 11. Such attenuation may continue until the target vehicle 11 has been substantially rigidized with the capture vehicle 10. In such an embodiment, the attenuation platform 122 may enable movement to assist the vehicle capture assembly 100 in engaging the target vehicle 11 while attenuating (e.g., minimizing) unwanted motion and/or force between the two vehicles 10, 11.

The lance motor 112 may retract the probe assembly 102 back toward the capture vehicle 10. The lance motor 112 may force the docking cone 114 into contact with the docking assembly 200 (e.g., within the outer cone 202) to further secure the target vehicle 11. A rim 208 of the docking assembly 200 may be forced into the backstop plate 118. The latches 120 may be actuated to engage with the rim 208, or another feature of the docking assembly 200 to further secure the target vehicle 11 into a rigidized connection.

To release the target vehicle 11 in a nondestructive manner (e.g., a repeatable manner), the vehicle capture assembly 100 may release the docking assembly 200 and return to the initial position. For example, the lance motor 112 may extend the probe assembly 102 back away from the capture vehicle 10. Force applied to the probe tip 108 may overcome a biasing element and move the probe tip 108 relative to an actuation component (e.g., an internal cam). The actuation component may rotate the barbs 106 to release the docking assembly 200 and the probe tip 108 may be removed from the docking assembly 200. Once the force is removed from the probe tip 108, the biasing element may return the probe tip 108 to the extended position where the barbs 106 may be returned to a deployed or capture position. The lance motor 112 may return the probe assembly 102 to the initial position similar to that shown in FIGS. 2 and 3.

To release the target vehicle 11 in another manner, one or more of the vehicle capture assembly 100 and/or the docking assembly 200 may include a destructively or nondestructively releasably union. For example, a coupling portion 210 may be coupled to the target vehicle 11 and releasably coupled to the remaining portion of the docking assembly 200 via a releasable union 212. In some embodiments, the releasable union 212 may include a pyrotechnic coupling (e.g., one or more exploding bolts) that may explosively release the docking assembly 200 from the target vehicle 11. In additional embodiments, the releasable union 212 may be a nondestructively releasable union (e.g., a remotely releasably electronic and/or magnetic latch or coupling).

Figure 6:
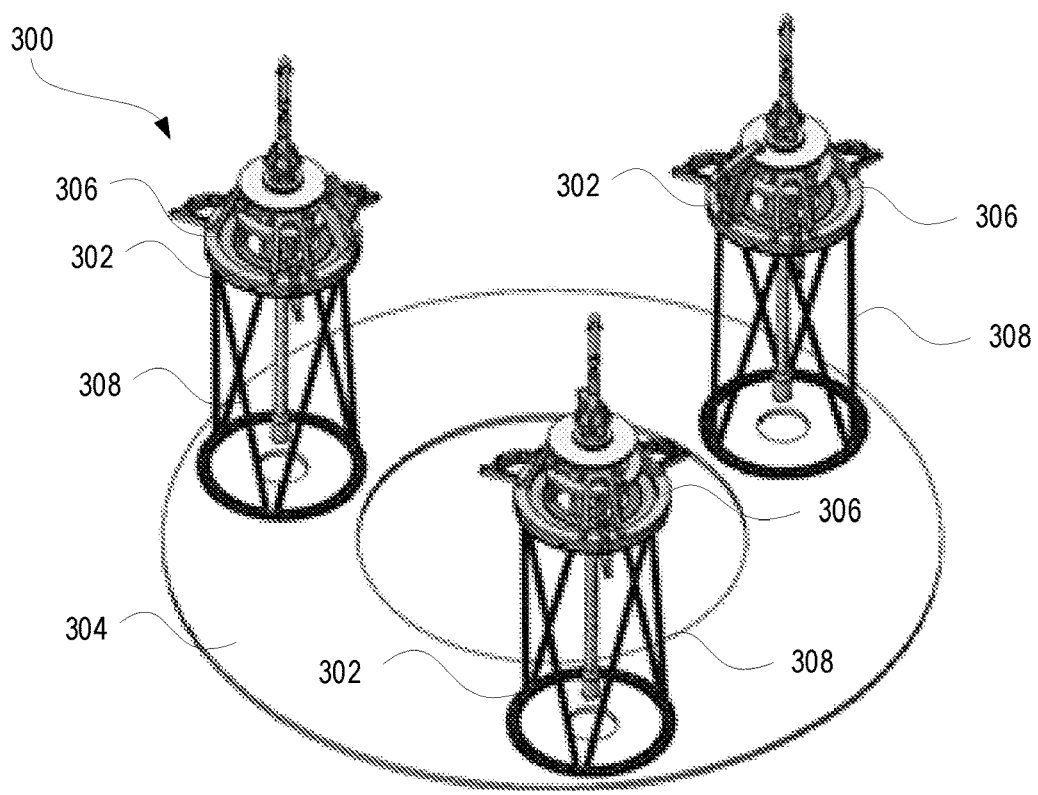
FIG. 6 is an isometric view of a vehicle capture system including multiple vehicle capture assemblies according to one or more embodiments of the disclosure.

FIG. 6 is an isometric view of a vehicle capture system 300 including multiple vehicle capture assemblies 302. In some embodiments, the multiple vehicle capture assemblies 302 may be similar to and include similar components of the vehicle capture assemblies discussed above.

As shown in FIG. 6, the vehicle capture assemblies 302 (e.g., three assemblies or arms) may be coupled in a staggered formation (e.g., in a ring) on a capture vehicle 304 (e.g., which may be similar to the capture vehicle 10 (FIG. 1)). As depicted, the vehicle capture assemblies 302 may be offset from a central portion or centerline of the capture vehicle 304. Such offset may provide clearance for propulsion systems or elements (e.g., primary engines) of the capture vehicle 304 and/or the target vehicle.

Two or more of the vehicle capture assemblies 302 may collectively (e.g., substantially simultaneously) dock with the target vehicle and draw and secure the target vehicle and capture vehicle 304 together by substantially simultaneously retracting each lance assembly of the vehicle capture assemblies 302. In some embodiments, the vehicle capture assemblies 302 may provide redundant docking connections in case of a misaligned or otherwise failed docking with one or more of the vehicle capture assemblies 302.

As depicted, each of the vehicle capture assemblies 302 may include a respective attenuation platform 306, which may be similar to the attenuation platforms discussed above. The attenuation platforms 306 may each be fixedly coupled to the capture vehicle 304 (e.g., with mounting frames 308) and movably coupled to a respective one of the vehicle capture assemblies 302. The attenuation platforms 306 may each enable independent movement of the vehicle capture assemblies 302 relative to each other and to the capture vehicle 304.

Figure 7:
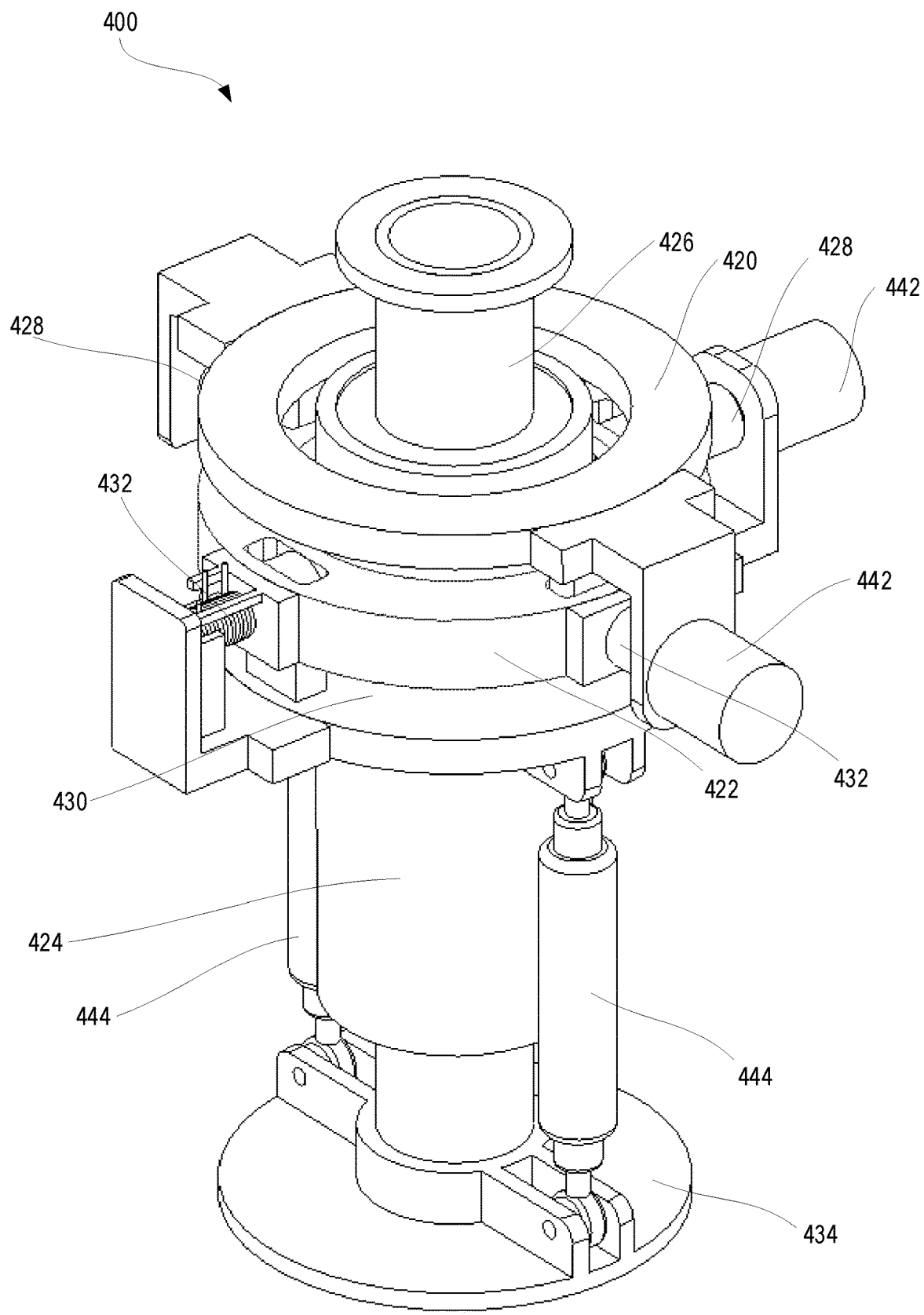
FIG. 7 is an isometric view of a probe movement feature according to one or more embodiments of the disclosure.

FIG. 7 is an isometric view of a probe movement feature (e.g., an attenuation platform 400). In some embodiments, the attenuation platform 400 may be similar to the attenuation platforms 24, 122 discussed above.

As depicted, the attenuation platform 400 may include a first platform 420 and a second platform 422 where one of the first platform 420 or the second platform 422 may be coupled (e.g., rigidly coupled) to the capture vehicle 10. For example, the first platform 420 may be movably coupled (e.g., rotatably coupled) to the second platform 422 while being rigidly coupled to the capture vehicle 10. The second platform 422 may be movably coupled (e.g., rotatably coupled) to a central member 424 where a portion of the central member 424 receives the at least a portion of the vehicle capture assembly 100 (FIG. 1). For example, the central member 424 may comprise a shaft 426 that receives (e.g., and couples to) the lance boom 110 (FIG. 1). In some embodiments, the shaft 426 may be able to slide within the central member 424.

The second platform 422 may be movably coupled to the first platform 420 via one or more movable unions or joints 428 to enable the second platform 422 to move relative to both the first platform 420 and the capture vehicle 10. The movable unions or joints 428 may provide at least one degree of freedom (e.g., rotational and/or translational) of movement between the second platform 422 and the first platform 420. For example, the attenuation platform 400 may include the first platform 420 rotatably coupled to the second platform 422 to enable the vehicle capture assembly 100 to rotate about a first axis of movement.

The second platform 422 may be rotatably coupled to a portion of the central member 424 (e.g., a platform 430 of the central member 424) at one or more movable unions or joints 432 to enable the vehicle capture assembly 100 to rotate about a second axis of movement. The second axis may be positioned in a transverse direction to (e.g., perpendicular to) the first axis. For example, as oriented in FIG. 7, the first and second axes may be an x-axis and a z-axis (e.g., two horizontal axes). As depicted, the joints 428, 432 may be offset by about 90 degrees to enable rotation about two substantially orthogonal axes.

The attenuation platform 400 may be able to translate to define one or more prismatic joints or unions enabling one or more translational degrees of freedom (e.g., enabling pure translational movement). For example, the shaft 426 of the central member 424 may translate relative to the central member 424 e.g., with the first and second platforms 420, 422 coupled to the central member 424) to provide one degree of translational freedom along a third axis. As depicted, the third axis may be positioned in a transverse direction to (e.g., perpendicular to) both of the first and second axes. As oriented in FIG. 7, the third axis may be a y-axis (e.g. a vertical axis).

As depicted, the overall assembly of the first and second platforms 420, 422 coupled to the central member 424 may move relative to a base member 434 to provide the translation. In some embodiments, the shaft 426 may couple to the base member 434 such that the shaft 426 and base member 434 translate together relative to the central member 424. In additional embodiments, the shaft 426 may also translate relative to base member 434.

In some embodiments, the first platform 420 and the second platform 422 may operate as an approximate universal joint or as a true universal joint. Once the capture vehicle 10 (FIG. 1) and the target vehicle 11 (FIG. 1) are joined, the attenuation platform 400 may enable the synchronization of velocities of the vehicles (e.g., in six degrees of freedom, for example, where three or more attenuated connections are made with the vehicle capture assemblies 100) and may minimize any rate differences (e.g., velocity rates) between the vehicles 10, 11.

In some embodiments, where multiple vehicle capture assemblies 100 are utilized (e.g., three vehicle capture assemblies 100), the combination of the vehicle capture assemblies 100 coupled to respective docking assemblies 18 of the target vehicle 11 (FIG. 1) may approximate another universal joint to provide attenuation of movement and/or forces between the vehicles 10, 11. For example, both the barbs 106 (e.g., three barbs) and an inner portion of the docking assembly 18 with which a distal end of the barbs 106 engage may comprise complementary surfaces. In some embodiments, both the barbs 106 and the inner portion of the docking assembly 18 may define at least partially spherical surfaces that enable the barbs 106 to move (e.g., slide along) an inner surface of the docking assembly 18 to provide the approximate universal joint.

While certain embodiments discussed herein are directed to the attenuation platform 400 having three degrees of freedom (e.g., one translational and two rotational), other embodiments may include other variations of degrees of freedom, both rotational and translational (e.g., one to three of each).

The attenuation platform 400 may include a number of biasing and/or dampening members (e.g., passively operating mechanical biasing and dampening members including mechanical biasing mechanisms, such as springs, and/or hydraulic dampening mechanisms). For example, linear and/or rotational dampening members (e.g., rotational dampening members 442) may be positioned at the joints 428, 432 to dampen relative movement between the first platform 420 and the second platform 422 and the second platform 422 and the central member 424. As depicted, one or more linear and/or rotational damping members (e.g., two or more linear dampening members 444, such as struts) may be positioned between the central member 424 and the base portion 434.

The dampening members 442, 444 may collectively act to dampen both rotational and translational movement of the vehicle capture assembly 100. That is, the dampening members 442, 444 may allow some movement of the vehicle capture assembly 100 while dampening or attenuating the movement. For example, rotation of the first platform 420, the second platform 422, and the central member 424 may enable a distal end of the vehicle capture assembly 100 to move back or forth in lateral directions (e.g., relative to a length or longitudinal axis of the vehicle capture assembly 100 or a centerline of the capture vehicle 10) while the dampening members 442 dampen the rotation required to move the vehicle capture assembly 100. Likewise, the translatable central member 424 may enable the vehicle capture assembly 100 to move along a length or longitudinal axis of the vehicle capture assembly 100 toward and away from the capture vehicle 10 while the dampening members 444 dampen the translation of the vehicle capture assembly 100.

In some embodiments, the dampening members 442, 444 may bias the vehicle capture assembly 100 in an initial position such that the dampening members 442, 444 dampen the movement of the vehicle capture assembly 100 deviating from the initial position and tend to force the vehicle capture assembly 100 back to its original orientation in the initial position. For example, the dampening members 442, 444 may return the vehicle capture assembly 100 to a position perpendicular to one or more of the first platform 420, the second platform 422, or surface of the capture vehicle 10 to which the attenuation platform 400 is mounted. The dampening members 442 may return the vehicle capture assembly 100 to a position relatively further away from the capture vehicle 10.

In some embodiments, the dampening members 442, 444 may attenuate movement during a docking procedure. For example, the dampening members 442, 444 may dampen transitional forces between the vehicles 10, 11 (FIG. 1) as the docking assembly 100 is inserted in a docking cone of the target vehicle 11.

The embodiments of the disclosure described above and illustrated in the accompanying drawing figures do not limit the scope of the disclosure, since these embodiments are merely examples of embodiments of the disclosure. The disclosure is defined by the appended claims and their legal equivalents. Any equivalent embodiments lie within the scope of this disclosure. Indeed, various modifications of the present disclosure, in addition to those shown and described herein, such as alternative useful combinations of the elements described, will become apparent to those of ordinary skill in the art from the description. Such modifications and embodiments also fall within the scope of the appended claims and their legal equivalents. The terminology used herein was chosen to explain the principles of the embodiments, the practical application or technical improvement over technologies found in the marketplace, or to enable others of ordinary skill in the art to understand the embodiments disclosed herein.

What is claimed is:

1. A vehicle capture assembly for use with a capture vehicle, the vehicle capture assembly comprising:
    a probe assembly including one or more retention elements for engaging with and securing a target vehicle; and
    a probe movement feature coupled to the probe assembly, the probe movement feature comprising:
        a central member coupled to the probe assembly;
        a first platform for mounting the vehicle capture assembly to the capture vehicle;
        a second platform configured to move relative to the first platform;
        at least one movable union between the first platform and the second platform, the at least one movable union to enable the probe assembly to move in at least one degree of freedom relative to the capture vehicle, the central member configured to rotate and translate relative to the first platform and the second platform; and
    at least one attenuation feature to dampen movement of the probe assembly relative to the capture vehicle.

2. The vehicle capture assembly of claim 1, wherein the at least one movable union defines a universal joint.

3. The vehicle capture assembly of claim 2, wherein the at least one movable union further comprises an additional union enabling the central member to translate relative to the first platform and the second platform and the probe assembly to translate relative to the capture vehicle.

4. The vehicle capture assembly of claim 2, wherein the probe movement feature is configured to enable the probe assembly to translate in a direction transverse to axes of rotation of the universal joint.

5. The vehicle capture assembly of claim 3, wherein the additional union comprises a prismatic joint.

6. The vehicle capture assembly of claim 2, wherein the universal joint comprises a gimbal with two rotational degrees of freedom.

7. The vehicle capture assembly of claim 1, wherein the at least one attenuation feature comprises one or more dampening members positioned around the probe assembly, each of the one or more dampening members configured to dampen at least one of rotation or translation of the probe assembly relative to the capture vehicle.

8. The vehicle capture assembly of claim 1, wherein the one or more retention elements are configured to substantially define a universal joint with an inner surface of a docking cone of the target vehicle when the one or more retention elements are received in and engaged with the docking cone.

9. The vehicle capture assembly of claim 1, wherein the second platform is rotatably coupled to a platform of the central member.

10. The vehicle capture assembly of claim 1, wherein the central member extends through the first platform and the second platform.

11. A spacecraft capture system, comprising:
    at least one vehicle capture assembly to be positioned on a capture vehicle, the at least one vehicle capture assembly comprising:
        a probe assembly including one or more retention elements for engaging with and securing a target spacecraft;
        an extendable lance coupled to the probe assembly;
    a mounting platform for securing the at least one vehicle capture assembly to the capture vehicle; and
    at least one movable joint to enable the probe assembly and the extendable lance to rotate and translate relative to the capture vehicle.

12. The spacecraft capture system of claim 11, wherein the at least one vehicle capture assembly comprises three vehicle capture assemblies.

13. The spacecraft capture system of claim 12, wherein the three vehicle capture assemblies are configured to substantially simultaneously retract each respective probe assembly of the three vehicle capture assemblies in order to secure the target spacecraft.

14. The spacecraft capture system of claim 11, further comprising an attenuation feature configured to attenuate translational forces between the target spacecraft and the capture vehicle during a docking procedure.

15. The spacecraft capture system of claim 11, further comprising an attenuation feature configured to attenuate rotational forces between the target spacecraft and the capture vehicle during a docking procedure.

16. A method of forming a vehicle capture assembly for capturing a target spacecraft, the method comprising:
    coupling the vehicle capture assembly to a capture vehicle, the vehicle capture assembly comprising a probe configured to engage with and capture the target spacecraft;
    enabling the probe to rotate and translate relative to the capture vehicle with a probe movement feature of the vehicle capture assembly; and
    dampening at least one of rotation of the probe relative to the capture vehicle or translation of the probe relative to the capture vehicle with an attenuation feature.

17. The method of claim 16, further comprising enabling the probe to extend toward the target spacecraft independently of the translation of the probe provided by the probe movement feature.

18. The method of claim 16, wherein dampening with the attenuation feature comprises passively attenuating the target spacecraft with the attenuation feature.

19. The method of claim 16, wherein coupling the vehicle capture assembly to the capture vehicle comprises coupling two additional probes to the capture vehicle.

20. The method of claim 16, further comprising enabling the probe to rotate about two axes of movement.

* * * * *